US008219092B2

(12) United States Patent
Oteri et al.

(10) Patent No.: US 8,219,092 B2
(45) Date of Patent: Jul. 10, 2012

(54) USER EQUIPMENT FREQUENCY ALLOCATION METHODS AND APPARATUS

(75) Inventors: Oghenekome F. Oteri, Austin, TX (US); Ahsan U. Aziz, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 487 days.

(21) Appl. No.: 11/542,512

(22) Filed: Oct. 2, 2006

(65) Prior Publication Data

US 2008/0081633 A1 Apr. 3, 2008

(51) Int. Cl.
 *H04W 36/00* (2009.01)
(52) U.S. Cl. ........ 455/436; 455/438; 455/439; 455/444; 455/448; 455/449; 455/452.2
(58) Field of Classification Search ............... 455/452.2, 455/446, 436–444, 448–449
See application file for complete search history.

(56) References Cited

U.S. PATENT DOCUMENTS

| | | | | |
|---|---|---|---|---|
| 5,375,123 A | * | 12/1994 | Andersson et al. | 370/333 |
| 5,557,657 A | * | 9/1996 | Barnett | 455/444 |
| 6,262,980 B1 | * | 7/2001 | Leung et al. | 370/336 |
| 6,269,245 B1 | * | 7/2001 | Li et al. | 455/450 |
| 6,370,383 B1 | * | 4/2002 | Leatham et al. | 455/446 |
| 6,490,452 B1 | * | 12/2002 | Boscovic et al. | 455/436 |
| 6,741,837 B1 | | 5/2004 | Nakano et al. | |
| 2004/0106412 A1 | * | 6/2004 | Laroia et al. | 455/448 |
| 2004/0203806 A1 | | 10/2004 | Craig et al. | |
| 2005/0265222 A1 | | 12/2005 | Gerlach | |
| 2006/0094363 A1 | | 5/2006 | Kang et al. | |
| 2008/0081633 A1 | * | 4/2008 | Oteri et al. | 455/452.1 |

OTHER PUBLICATIONS

Nokia, Uplink inter cell interference mitigation and text proposal, 3GPP TSG RAN WG1 #44 Meeting, R1-060298, Denver, US, Feb. 13-17 2006.
Motorola, Interference Mitigation via Power Control and FDM Resource Allocation and UE Alignment for E-UTRA Uplink and TP, 3GPP TSG RAN WG1 #44 Meeting R1-060401, Denver, US, Feb. 13-17, 2006.
Ericsson, Uplink Inter-cell inference co-ordination/avoidance— evaluation of frequency reuse, TSG-RAN WG1 #45, R1-061375, Shanghai, China, May 8-12, 2006.
Texas Instruments, Uplink Interference Mitigation via Power Control, 3GPP TSG RAN WG1#45, R1-061487, Shanghai, China, May 8-12, 2006.

* cited by examiner

*Primary Examiner* — Charles Appiah
*Assistant Examiner* — Jaime Holliday
(74) *Attorney, Agent, or Firm* — Sherry W. Schumm

(57) ABSTRACT

In an embodiment, a wireless communication system (100, FIG. 1) includes one or more nodes (102-108) and one or more user equipments (UE) (130-134). A node may service a cell (110-116). A UE may be classified (802, FIG. 8) into a cell-edge UE group when the UE is within in a cell-edge region (504, 506, 508, FIG. 5) of a cell. The cell-edge UE group may be allocated at least one first frequency range within an available bandwidth (600, 700, FIGS. 6 and 7). A UE may be reclassified (808, FIG. 8) into a cell-center UE group based on at least one indicator of UE performance. The cell-center UE group may be allocated at least one second frequency range within the available bandwidth.

21 Claims, 5 Drawing Sheets

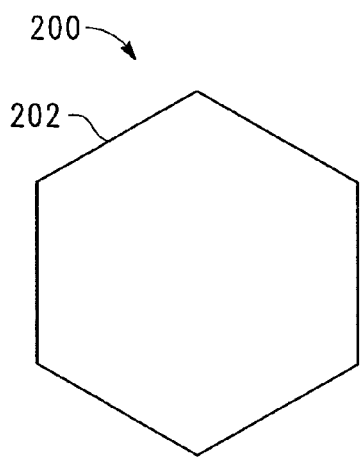
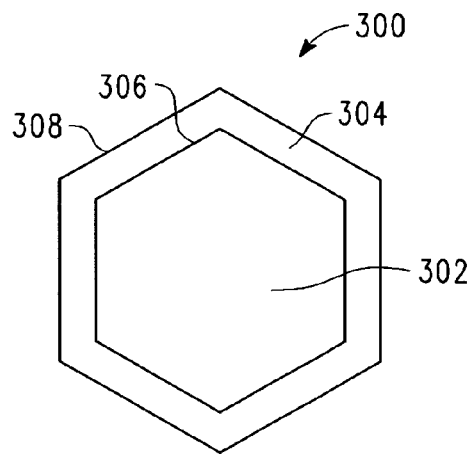
FIG. 2  FIG. 3
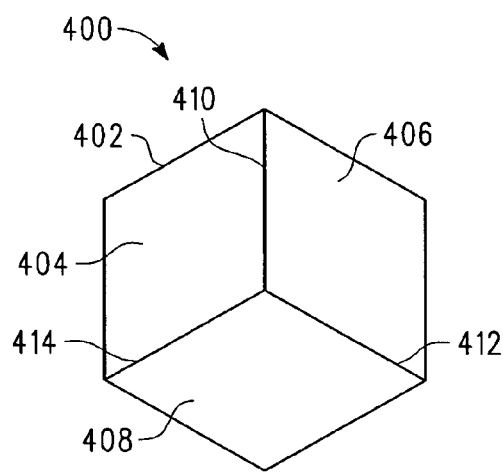
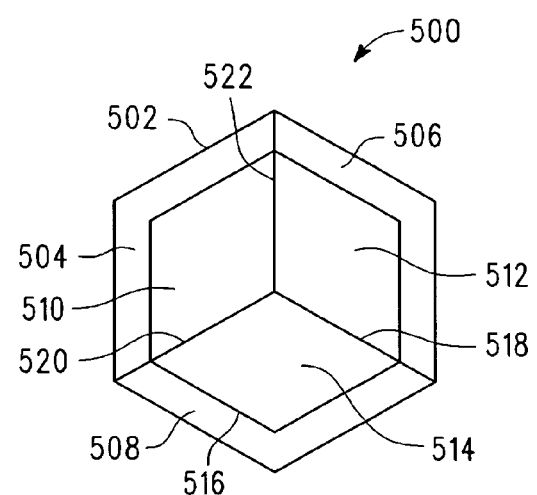
FIG. 4  FIG. 5

US 8,219,092 B2

USER EQUIPMENT FREQUENCY ALLOCATION METHODS AND APPARATUS

TECHNICAL FIELD

Embodiments of the inventive subject matter relate to wireless communication systems, and more specifically, to methods and apparatus to allocating frequencies to user equipment within a wireless communication system.

BACKGROUND

In a wireless communication network (e.g., a cellular telephone network), user equipment (UE) may communicate with the network by transmitting uplink signals to the network's base stations. When multiple UEs that are proximate to each other transmit uplink signals, significant co-channel interference may be present, which may reduce the communications quality of the system.

In some systems, a UE that is relatively far from a base station with which it is communicating may boost its signal power so that its signal may have a larger Signal to Interference plus Noise Ratio (SNR) when it is received at the base station. For example, a UE located near a cell edge may transmit at maximum power in order to increase the likelihood that the signal will reach the cell's base station with an acceptable SNR. In these cases, the co-channel interference issue may be exacerbated, since UEs near each other that are transmitting at high power may essentially drown each other out. Wireless system developers continue to seek methods and apparatus for reducing the effects of co-channel interference on system performance.

BRIEF DESCRIPTION OF THE DRAWINGS

FIG. 2 illustrates an example of a two-dimensional cell model, in accordance with an example embodiment;

FIG. 3 illustrates an example of a two-dimensional cell model having a cell-center region and a cell-edge region, in accordance with an example embodiment;

FIG. 4 illustrates an example of a two-dimensional cell model having multiple sectors, in accordance with an example embodiment;

FIG. 5 illustrates an example of a two-dimensional cell model having multiple cell-edge regions, and a cell-center region defined by portions of multiple sectors, in accordance with an example embodiment;

DETAILED DESCRIPTION

Embodiments described herein include methods and apparatus implemented within wireless communication systems, user equipment (UE), and base stations. In various embodiments, the term "wireless communication system" may be defined as a communication system in which user equipment and base stations communicate with each other over an air interface. A wireless communication system may be a system such as a cellular telephone system, a radio system, a satellite communication system, a wireless local area network (WLAN), a wireless personal area network (WPAN), an air-to-air or air-to-ground communication system, other wireless systems, or combinations of various types of systems, for example but not by way of limitation.

Figure 1:
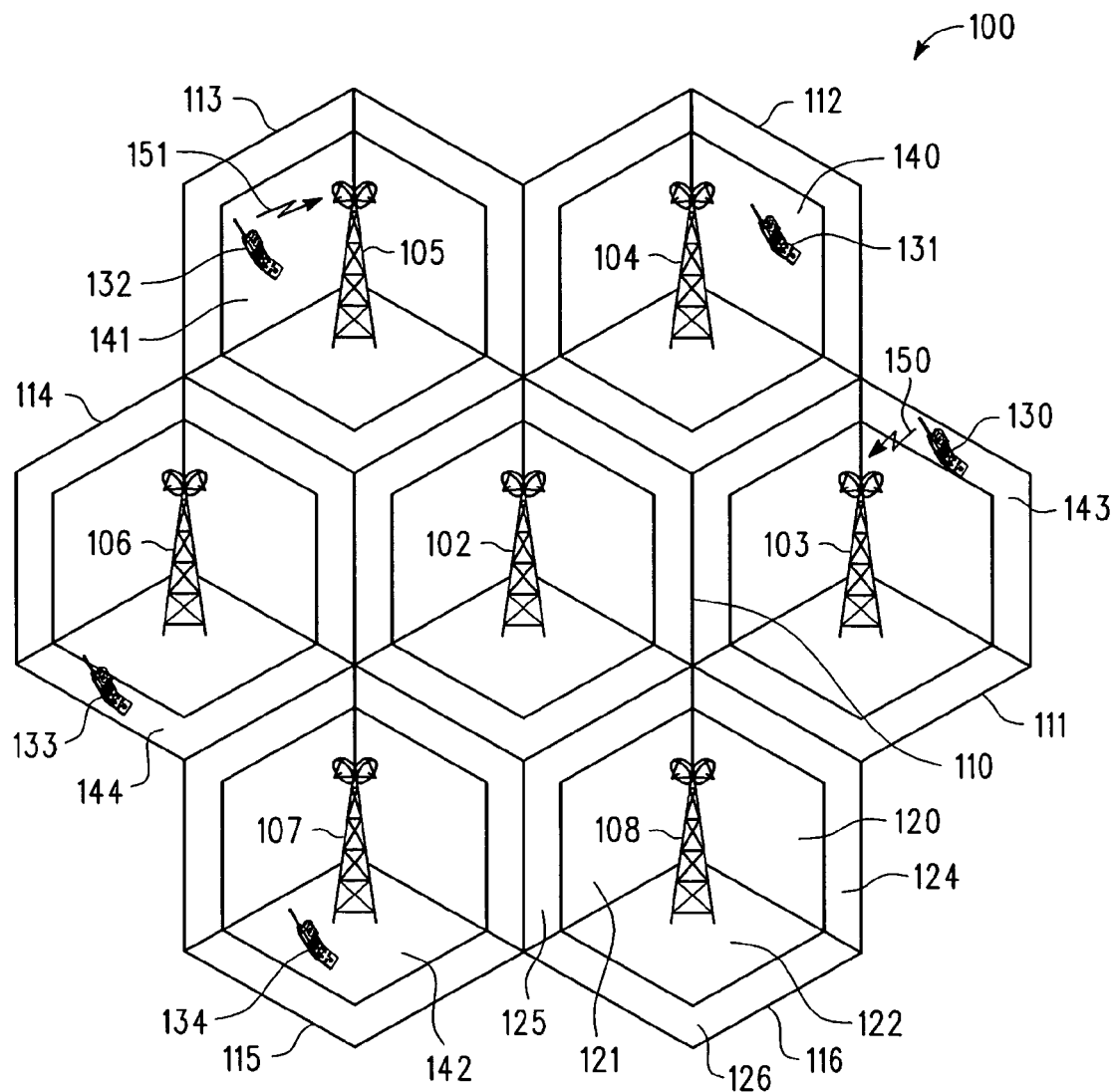
FIG. 1 illustrates a wireless communication system, in accordance with an example embodiment.

FIG. 1 illustrates a wireless communication system 100, in accordance with an example embodiment. System 100 may include at least one base station (BS) 102, 103, 104, 105, 106, 107, 108 and at least one wireless communication unit or UE 130, 131, 132, 133, 134. Although seven BS 102-108 and five UEs 130-134 are illustrated in FIG. 1, system 100 may include more or fewer BSs and/or more or fewer UEs. In various embodiments, system 100 may include from one to thousands of BSs and from one to millions of UEs.

UEs 130-134 may include wireless communication apparatus, which may transmit and/or receive information over an air interface or other wireless communication medium. UEs 130-134 may be selected from a group of equipment types that includes, but is not limited to, cellular telephones, one-way and two-way radios, computers, personal data assistants (PDAs), pagers, and WPAN-compatible devices, other types of wireless communication apparatus, and equipment that provides multiple types of functionality, for example.

A BS 102-108, which also may be referred to as "node" or "cell site," may include a transceiver, which receives uplink radio signals from UEs 130-134 and transmits downlink radio signals toward UEs 130-134. BSs 102-108 may be connected together to form a BS network, and/or BSs 102-108 may connect to one or more public switched telephone networks (PSTNs) or other networks.

A group of BSs 102-108 together service a network of cells 110, 111, 112, 113, 114, 115, 116 within which information may be exchanged with UEs 130-134. Although system 100 illustrates one cell 110-116 associated with each BS 102-108, each BS 102-108 may service multiple cells (e.g., two, three or more).

Multiple cells may be used to cover a larger area than would be possible to cover using just one cell. Each BS 102-108 may service at least one cell 110-116 to facilitate wireless communications between BSs 102-108 and UEs 130-134. Generally, a cell 110-116 is defined by a static or dynamic geographical area proximate to a BS 102-108. In various embodiments, a cell may be omni-directional (as is illustrated in FIG. 1) or directional.

Communications between BS 102-108 and UEs 130-134 may be governed by one or more communication technologies. For example, but not by way of limitation, communications between BSs 102-108 and UEs 130-134 may use any of a number of modulation and multiple access technologies. In various embodiments, modulation and multiple access on the uplink and/or downlink may be performed using one or more technologies selected from a group of technologies that includes, but is not limited to, Time Division Multiple Access (TDMA), Frequency Division Multiple Access (FDMA), Code Division Multiple Access (CDMA), Wideband CDMA (WCDMA), Orthogonal FDMA (OFDMA), Interleaved FDMA (IFDMA), Discrete Fourier Transform (DFT) spread OFDMA (DFT OFDMA), Spatial Division Multiple Access (SDMA), or combinations thereof, for example.

Selected ones of cells 110-116 may include various regions. For example, cell 116 is illustrated to have cell-center regions 120, 121, 122 and cell-edge regions 124, 125, 126. UEs 130-134 may be classified as cell-center UEs, when they are located within a cell-center region (e.g., regions 120-122). Alternatively, UEs may be classified as cell-edge UEs when they are located within a cell-edge region (e.g., regions 124-126). For example, UEs 131, 132, and 134 are located within cell center regions 140, 141, 142, and thus may be classified as cell-center UEs. UEs 130 and 133 are located within cell edge regions 143, 144, and thus may be classified as cell-edge UEs. UEs may be defined as cell-edge or cell-center based on one or more metrics, such as pathloss, shadowing, pathloss loss, UE physical location, UE geometry, and/or other factors.

UEs 130-134 may transmit uplink signals (e.g., signals 150, 151) to BS 102-108 at frequencies that fall within an available bandwidth. Because multiple UEs within a cell may transmit uplink signals at the same time, a BS 102-108 may receive signals that are affected by co-channel interference. In an embodiment, portions of the available bandwidth may be allocated to groups of UE in order potentially to reduce co-channel interference.

Embodiments of the inventive subject matter include methods and apparatus to classify each UE as belonging to a UE category, where UEs within a particular UE category may transmit uplink signals using only those frequencies within the available bandwidth that are allocated to the UE category. In an embodiment, UE categories include a cell-center UE category, and one or more cell-edge UE categories. A UE may be classified as a cell-center UE or a cell-edge UE, based on one or more of a number of factors. FIGS. 2-5 more clearly indicate how a cell may include multiple sectors, and further how a cell may include one or more cell-center regions and cell-edge regions.

FIG. 2 illustrates an example of a two-dimensional cell model 200, in accordance with an example embodiment. Cell 200 represents the geographical area covered by a BS's antenna system. Cell 200 is an un-sectored cell, and it is modeled as having a hexagonal cell-edge outer boundary 202. Accordingly, cell 200 may be physically defined by cell-edge outer boundary 202. In other embodiments, a cell may be modeled as having a differently shaped outer boundary. In reality, a cell-edge outer boundary may not accurately be definable using a regular geometric pattern. Instead, a cell-edge outer boundary may be defined as a continuum of points where the BS antenna system's ability to provide coverage falls below a given threshold, for example. Because the communication environment and conditions continuously may change, a cell-edge outer boundary may change dynamically. However, for ease of description, a cell-edge outer boundary 202 may be considered to have a static, geometric shape, as is illustrated in FIGS. 2-5.

FIG. 3 illustrates an example of a two-dimensional cell model 300 having a cell-center region 302 and a cell-edge region 304, in accordance with an example embodiment. Cell-center region 302 may be physically defined by a cell-edge inner boundary 306. Cell-edge region 304 may be physically defined by the cell-edge inner boundary 306 and a cell-edge outer boundary 308. In an embodiment, a BS (not illustrated) may be located within cell-center region 302. One or more UEs (not illustrated) may be located within cell-center region 302 and/or cell edge region 304.

FIG. 4 illustrates an example of a two-dimensional cell model 400 having multiple sectors 404, 406, 408, in accordance with an example embodiment. Cell 400 may be physically defined by cell-edge outer boundary 402.

Cell 400 includes three sectors 404, 406, 408, and the combination of sectors 404, 406, 408 forms cell 400. Each sector 404, 406, 408 may be physically defined by a portion of cell-edge outer boundary 402 and two sector side boundaries 410, 412, 414. A "sector" may be defined, in various embodiments, as a portion of a cell to which a distinct set of channels is allocated, which channels are distinct from the channels of other sectors of the same cell. A "sector" also may be defined, in various embodiments, as geographical area that is allocated a portion of the bandwidth available to the BS, which portion does not overlap the portions allocated to other sectors of the same cell. A "sector" also may be defined, in various embodiments, as a geographical area serviced by one of multiple, directional antenna subsystems of a BS, each of which provides coverage (e.g., channels) over a different geographical area.

Although the term "sector" is used herein, it is to be understood that a sector alternatively may itself be considered a "cell," using different terminology. Accordingly, use of the term "sector" is not meant to limit the scope of the inventive subject matter to systems that employ the term. Instead, the term "sector" is used for description purposes only.

Although cell 402 is illustrated to have three sectors 404, 406, 408, in other embodiments, cell 402 may have more or fewer sectors, and the cells within a network may have the same number of sectors or may have different numbers of sectors.

FIG. 5 illustrates an example of a two-dimensional cell model 502 having multiple cell-edge regions 504, 506, 508, and a cell-center region defined by portions 510, 512, 514 of multiple sectors, in accordance with an example embodiment. Each sector may be defined as having a cell-center sector portion and a cell-edge sector portion. For example, a first sector may be defined as including cell-center sector portion 510 and cell-edge sector portion 504, a second sector may be defined as including cell-center sector portion 512 and cell-edge sector portion 506, and a third sector may be defined as including cell-center sector portion 514 and cell-edge sector portion 508.

Each portion 510, 512, 514 of the cell-center region may be physically defined by cell-edge inner boundary 516 and parts of two sector side boundaries 518, 520, 522. Each cell-edge region 504, 506, 508 may be physically defined by cell-edge inner boundary 516, cell-edge outer boundary 502, and parts of two sector side boundaries 518, 520, 522.

In an embodiment, the sectors in the network may be categorized based on their relative position in a cell. For example, sector 404 (FIG. 4) may be categorized as an "A-sector," sector 406 may be categorized as a "B-sector," and sector 408 may be categorized as a "C-sector." In an embodiment, the remaining sectors in the network are categorized so that sectors adjacent to each other fall into different sector categories.

In an embodiment, each UE may be classified as belonging to a UE group that is associated with a sector category and a particular region of a sector. In an embodiment, each sector may have a cell-center region and a cell-edge region. Accordingly, six UE groups may be defined, based on the sector category (e.g., A, B or C) and the region of the sector (e.g., cell-center or cell-edge). Referring also to FIG. 5, to identify the cell/sector area associated with each group, the UE groups may include the following, in an embodiment: 1) an A-sector cell-center UE group (e.g., for region 510); 2) an A-sector cell-edge UE group (e.g., for region 504); 3) a B-sector cell-center UE group (e.g., for region 512); 4) a B-sector cell-edge UE group (e.g., for region 506); 5) a C-sector cell-center UE group (e.g., for region 514); and 6) a C-sector cell-edge UE group (e.g., for region 508).

In an embodiment, each UE may initially be classified as belonging to a particular UE group. When a UE is "classified"

as belonging to a particular UE group, the UE is permitted and/or directed, by the system, to use the portion of the available bandwidth that the system has allocated to that UE group.

Initial UE classifications may be made based on any one or more of a group of classification criteria. For example, but not by way of limitation, initial classification criteria may include an identification of the sector in which the UE is located, and an estimate of whether the UE is located in a cell-center region or a cell-edge region. The estimate may be based on measurements of path loss, shadowing or other signal quality related observations.

In various embodiments, as will be described later, the system may attempt to improve system performance by reclassifying selected ones of UEs from a current UE group into another UE group, monitoring the effects that the reclassification has on the system performance, and taking additional action when system performance is degraded as an apparent result of the reclassification. After the reclassification process, a UE may or may not be located within a part of a cell with which its current UE group is identified. In other words, for example, a UE initially may be classified as belonging in an A-sector cell-edge UE group, and may be reclassified into an A-sector cell-center UE group, even though the UE's physical location has not changed significantly.

Figure 6:
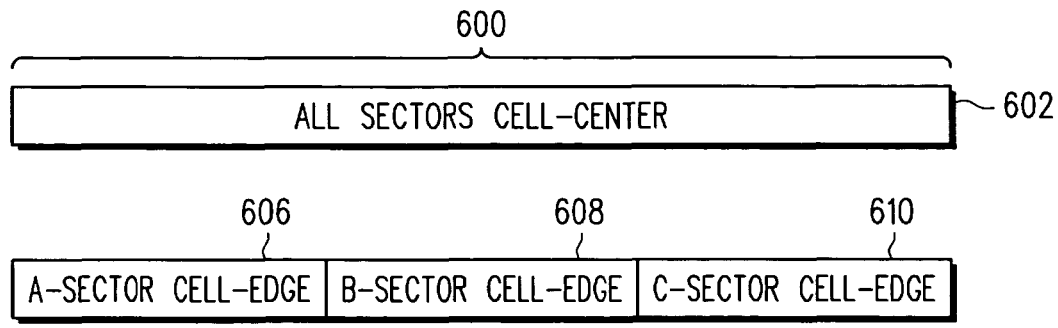
FIG. 6 illustrates example bandwidth allocations for a cell-center user equipment group and multiple cell-edge user equipment groups, in accordance with an example embodiment.
Figure 7:
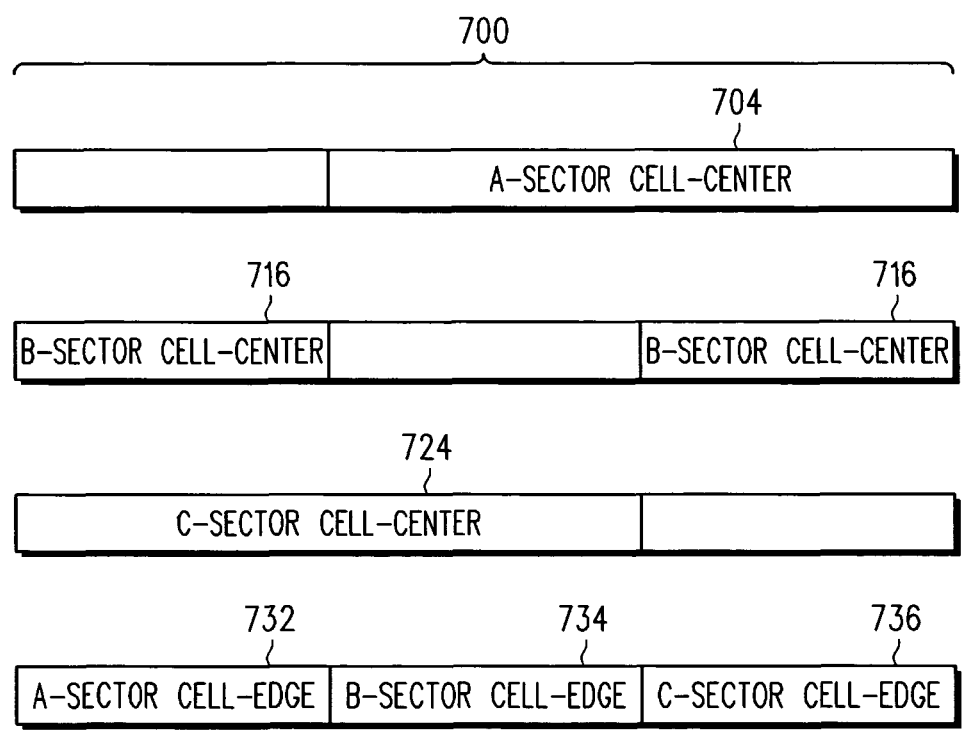
FIG. 7 illustrates example bandwidth allocations for a cell-center user equipment group and multiple cell-edge user equipment groups, in accordance with another example embodiment.

Portions of the bandwidth available within a cell may be allocated differently to the various UE groups. In an embodiment, the bandwidth allocated to each of the multiple cell-edge UE groups may be non-overlapping and/or the associated frequencies may be mutually orthogonal. The bandwidth allocated to cell-center UE groups may or may not overlap the bandwidth allocated to cell-edge UE groups, as will be explained in more detail, below. FIGS. 6 and 7 illustrate two different bandwidth allocation schemes, in accordance with different embodiments. It is to be understood that, in other embodiments, bandwidth allocation schemes other than those illustrated may be implemented. Further, although each UE group is illustrated as being allocated consecutive frequencies of the available bandwidth, any one or more of the UE groups may be allocated non-consecutive frequencies of the available bandwidth, in other embodiments.

FIG. 6 illustrates example bandwidth allocations for various UE groups, in accordance with an example embodiment. In an embodiment, a certain bandwidth 600 may be available for UE communications. For example, bandwidth 600 may include one or more ranges of frequencies within which the UEs are permitted to communicate. Bandwidth 600 may include a continuous range of frequencies, or may include multiple, continuous frequency ranges. For ease of explanation, the description herein assumes a continuous range of frequencies. Embodiments that utilize multiple frequency ranges are intended to be included within the scope of the inventive subject matter.

In an embodiment, all cell-center UE groups (e.g., A-sector cell-center UE group, B-sector cell-center UE group, and C-sector cell-center UE group) may be allocated a first range 602 of frequencies within the available bandwidth 600. In an embodiment, the first range 602 of frequencies may include substantially the entire available bandwidth 600. This means that UEs classified as belonging in any cell-center UE group may communicate using frequencies within any portion of the available bandwidth 600.

In an embodiment, each of the cell-edge UE groups (e.g., A-sector cell-edge UE group, B-sector cell-edge UE group, and C-sector cell-edge UE group) may be allocated frequency ranges 606, 608, 610 that are different from the range 602, in an embodiment. For example, an A-sector cell-edge UE group may be allocated range 606, a B-sector cell-edge UE group may be allocated range 608, and C-sector cell-edge UE group may be allocated range 610. Each of the cell-edge UE group ranges 606, 608, 610 may include substantially equal portions of the available bandwidth 600 (e.g., each may include approximately one third of the available bandwidth 600), in an embodiment. In alternate embodiments, the cell-edge UE group ranges 606, 608, 610 may include unequal portions of the available bandwidth 600.

In an embodiment, the cell-edge UE group ranges 606, 608, 610 are non-overlapping with each other (e.g., they each include frequencies that are distinct from the other ranges). The frequencies included in each of the cell-edge UE group ranges 606, 608, 610 may be mutually orthogonal to each other, in an embodiment.

FIG. 7 illustrates example bandwidth allocations for various UE groups, in accordance with another example embodiment. In an embodiment, a certain bandwidth 700 may be available for UE communications. For example, bandwidth 700 may include one or more ranges of frequencies within which the UEs are permitted to communicate. Bandwidth 700 may include a continuous range of frequencies, or may include multiple, continuous frequency ranges. As was explained in conjunction with FIG. 6, embodiments that utilize multiple frequency ranges are intended to be included within the scope of the inventive subject matter.

In an embodiment, the A-sector cell-center UE group, B-sector cell-center UE group, and C-sector cell-center UE group may be allocated frequency ranges 704, 716, 724, respectively. Unlike the previously-described embodiment, this means that UEs classified as belonging in a particular cell-center UE group may communicate using frequencies within only the portion of the available bandwidth 700 allocated to their group. Each of the cell-center UE group ranges 704, 716, 724 may include substantially equal portions of the available bandwidth 700 (e.g., each may include approximately two thirds of the available bandwidth 700), in an embodiment. In alternate embodiments, the cell-center UE group ranges 704, 716, 724 may include unequal portions of the available bandwidth 700.

In an embodiment, the cell-center UE group ranges 704, 716, 724 are non-overlapping with each other (e.g., they each include frequencies that are distinct from the other ranges). The frequencies included in each of the cell-center UE group ranges 704, 716, 724 may be mutually orthogonal to each other, in an embodiment.

In an embodiment, the A-sector cell-edge UE group, B-sector cell-edge UE group, and C-sector cell-edge UE group may be allocated frequency ranges 732, 734, 736, respectively. Each of the cell-edge UE group ranges 732, 734, 736 may include substantially equal portions of the available bandwidth 700 (e.g., each may include approximately one third of the available bandwidth 700), in an embodiment. In alternate embodiments, the cell-edge UE group ranges 732, 734, 736 may include unequal portions of the available bandwidth 700.

In an embodiment, the cell-edge UE group ranges 732, 734, 736 are non-overlapping with each other (e.g., they each include frequencies that are distinct from the other ranges). The frequencies included in each of the cell-edge UE group ranges 732, 734, 736 may be mutually orthogonal to each other, in an embodiment.

Embodiments of methods of classifying UEs will now be described in conjunction with FIGS. 8 and 9. Certain processes described in conjunction with FIGS. 8 and 9 may be performed by one or more system nodes, such as one or more BSs and/or control facilities.

Figure 8:
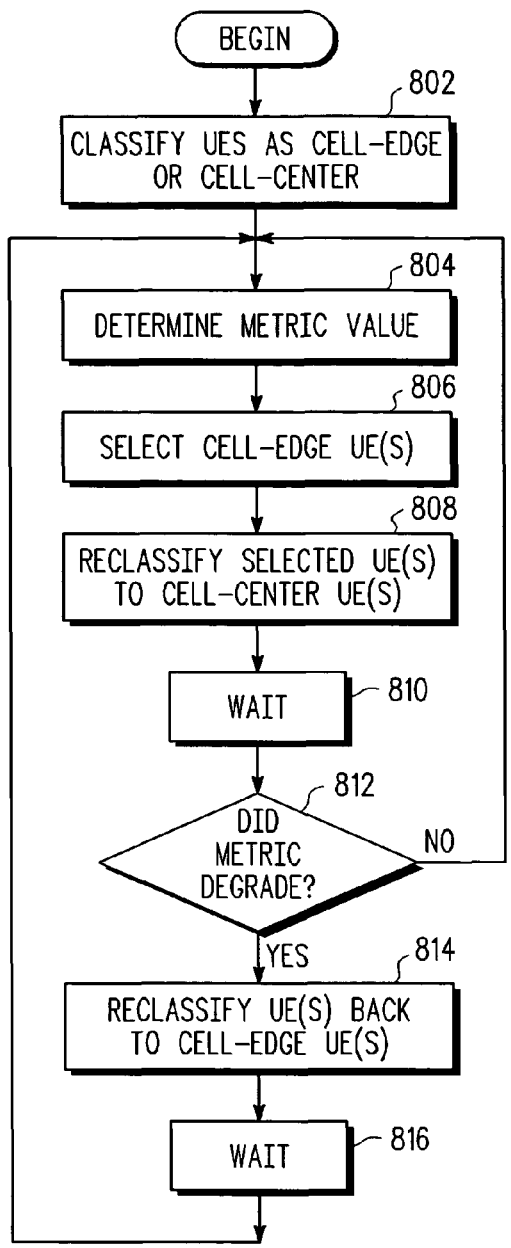
FIG. 8 is a flowchart of a method for classifying user equipment, in accordance with an example embodiment.

FIG. 8 is a flowchart of a method for classifying UEs, in accordance with an example embodiment In block 802, an embodiment of the method begins by performing an initial UE classification procedure. An initial UE classification procedure could be performed for each UE currently communicating with a BS, or it could be performed for an individual UE (e.g., when a UE requests service from a BS or moves from one sector to another within the same BS).

A UE initially may be classified as belonging to a particular UE group according to its position, in an embodiment, which may include an identification of the sector within which the UE will communicate and an estimate of whether the UE is in a cell-center region or a cell-edge region. In an embodiment, for example, when a UE is located in an A-sector, and its position is estimated to be within a cell-edge inner boundary (e.g., boundary 516, FIG. 5), then the UE may be classified as belonging to an A-sector cell-center UE group. Within the same sector, when the UE position is estimated to be between a cell-edge inner boundary (e.g., boundary 516) and a cell-edge outer boundary (e.g., boundary 502), then the UE may be classified as belonging to an A-sector cell-edge UE group.

When a UE is classified as belonging to a particular UE group, then the UE is to communicate uplink signals using the frequencies allocated to that UE group (e.g., frequency allocations illustrated in FIG. 6). In an embodiment, when a UE is classified, information regarding the classification may be sent to the UE, to enable the UE to know which frequencies it may use on the uplink. In various embodiments, the classification information may include a group identity (e.g., an indicator of which UE group the UE has been classified into), information identifying the frequencies that the UE may use, or other information that enables the UE to determine which frequencies it may use on the uplink.

During system operation, the network may monitor at least one system metric. Monitored system metrics may be selected from a group of metrics that includes an average Carrier-to-Interference plus Noise Ratio (CINR) and/or an average data throughput, for example but not by way of limitation. In an embodiment, in block 804, the system may determine and retain a "pre-reclassification" value for each of at least one monitored system metric.

The system dynamically may reclassify UEs based on UE performance and/or system metric evaluations. Dynamic reclassifications may affect either or both the UE performance and/or system metrics. In an embodiment, dynamic reclassification may include reclassifying at least one UE within a cell-edge UE group into a cell-center group.

In block 806, at least one cell-edge UE may be selected for reclassification. In an embodiment, the at least one cell-edge UE is selected based on at least one indicator of UE performance. The at least one indicator of UE performance may be selected from a group of indicators that includes a data throughput indicator and a signal quality indicator for example but not by way of limitation. In various embodiments, the at least one cell-edge UE selected for reclassification may include UE that are performing relatively better than performances of other cell-edge UEs. For example, but not by way of limitation, the selected UE may be performing the best of the cell-edge UE within the cell, or better than average when compared to the other cell-edge UE, or according to some other criteria.

In block 808, the at least one cell-edge UE selected in block 806 is reclassified into a cell-center UE group. In an embodiment, each UE is reclassified into a cell-center UE group for the sector in which the UE is located. For example, a UE classified in a B-sector cell-edge UE group may be reclassified into a B-sector cell-center UE group. Upon reclassification, the selected UE may begin communicating using the bandwidth allocated to their new cell-center group. For example, referring to FIG. 6, a UE previously classified in a B-sector cell-edge UE group may change from using frequency allocation 608 to using frequency allocation 602 (e.g., frequencies within the entire bandwidth).

In block 810, the system may wait for a period of time to allow the at least one monitored system metric to change. In various cases, the at least one monitored system metric may improve or degrade due to the UE reclassification. In other cases, the at least one monitored system metric may not be affected by the UE reclassification. Further, a system metric may change as a result of factors other than the reclassification.

In block 812, the system may determine a "post-reclassification" value for each of at least one monitored system metric, and may further determine whether the system metric has degraded from its pre-reclassification value. A system metric may be determined to have degraded, for example, if it has fallen below a threshold, has a value that is less than a previous value, or based on some other criteria. If the at least one monitored system metric has not degraded, then the method iterates as shown, and at least one additional UE may be selected for reclassification. In an embodiment, reclassification of UEs may be a dynamic process, in that it may go on continuously through the course of system operations, and may be triggered by UE geometry, cell load, UE distribution within the cell, and so on.

If the at least one monitored system metric has degraded, then in block 814, the reclassified UEs may be changed back to the cell-edge UE group out of which they were transferred. The system may then wait for a period of time, in block 816, to allow the at least one monitored system metric to change, and the method may iterate as shown.

Figure 9:
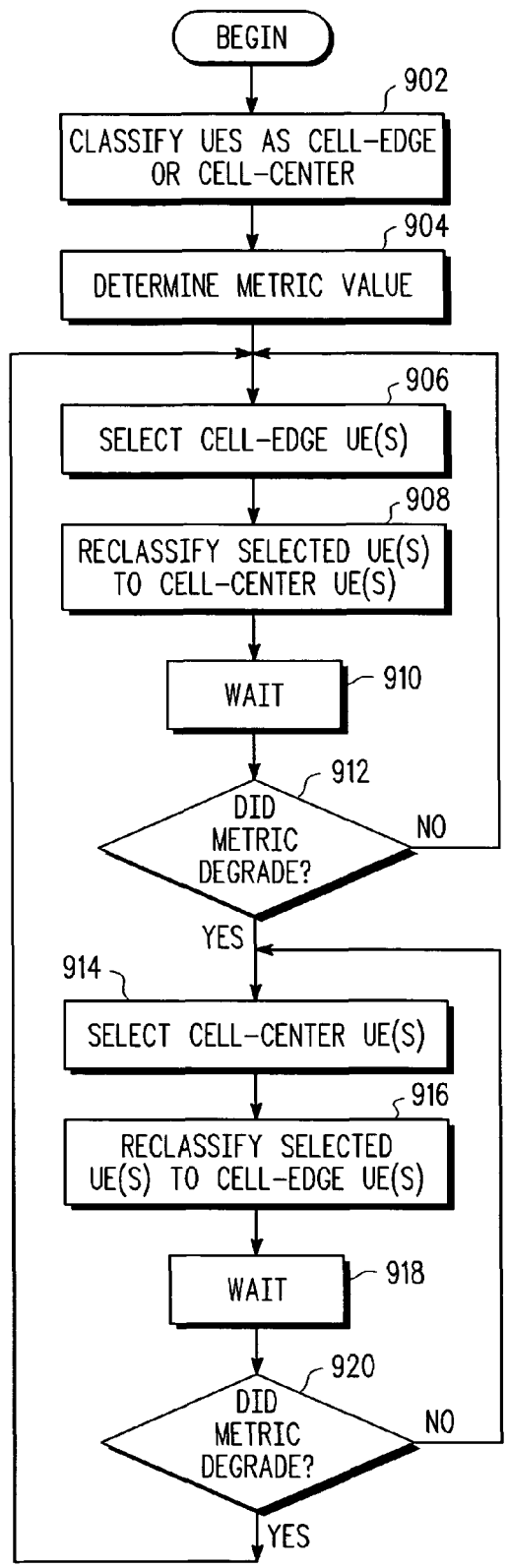
FIG. 9 is a flowchart of a method for classifying user equipment, in accordance with another example embodiment.

FIG. 9 is a flowchart of a method for classifying UEs, in accordance with another example embodiment. In block 902, an embodiment of the method begins by performing an initial UE classification procedure. An initial UE classification procedure could be performed for each UE currently communicating with a BS, or it could be performed for an individual UE. Embodiments of initial UE classifications were discussed previously in conjunction with block 802 of FIG. 8.

In an embodiment, in block 904, the system may determine and retain a pre-reclassification value for each of at least one monitored system metric. And in block 906, at least one cell-edge UE may be selected for reclassification. Embodiments of a UE selection process was discussed previously in conjunction with block 806 of FIG. 8.

In block 908, the at least one cell-edge UE selected in block 906 is reclassified into a cell-center UE group. In an embodiment, each UE is reclassified into a cell-center UE group for the sector in which the UE is located. In block 910, the system may wait for a period of time to allow the at least one monitored system metric to change.

In block 912, the system may determine a first post-reclassification value for each of at least one monitored system metric, and may further determine whether the system metric has degraded from its pre-reclassification value. A system metric may be determined to have degraded, for example, if it has fallen below a threshold, has a value that is less than a previous value, or based on some other criteria. If the at least one monitored system metric has not degraded, then the method iterates as shown, and at least one additional cell-edge UE may be selected for reclassification.

If the at least one monitored system metric has degraded, then in block 914, at least one cell-center UE may be selected for reclassification. In an embodiment, the at least one cell-center UE is selected based on at least one indicator of UE performance. The at least one indicator of UE performance may be selected from a group of indicators that includes a data throughput indicator and a signal quality indicator. In various embodiments, the at least one cell-center UE selected for reclassification may include UE that are performing relatively worse than performances of other cell-center UEs. For example, but not by way of limitation, the selected UE may be performing the worst of the cell-center UE within the cell, or worse than average when compared to the other cell-center UE, or according to some other criteria.

In block 916, the at least one cell-center UE selected in block 914 is reclassified into a cell-edge UE group. In an embodiment, each UE is reclassified into a cell-edge UE group for the sector in which the UE is located. In block 918, the system may wait for a period of time to allow the at least one monitored system metric to change.

In block 920, after reclassifying the at least one cell-center UE, the system may determine a second post-reclassification value for each of at least one monitored system metric, and may further determine whether the system metric has degraded from its first post-reclassification value. If the at least one monitored system metric has not degraded, then the method may iterate as shown, and at least one additional cell-center UE may be selected for reclassification. If the at least one monitored system metric has degraded, then the method may iterate as shown, and at least one additional cell-edge UE may be selected for reclassification.

Figure 10:
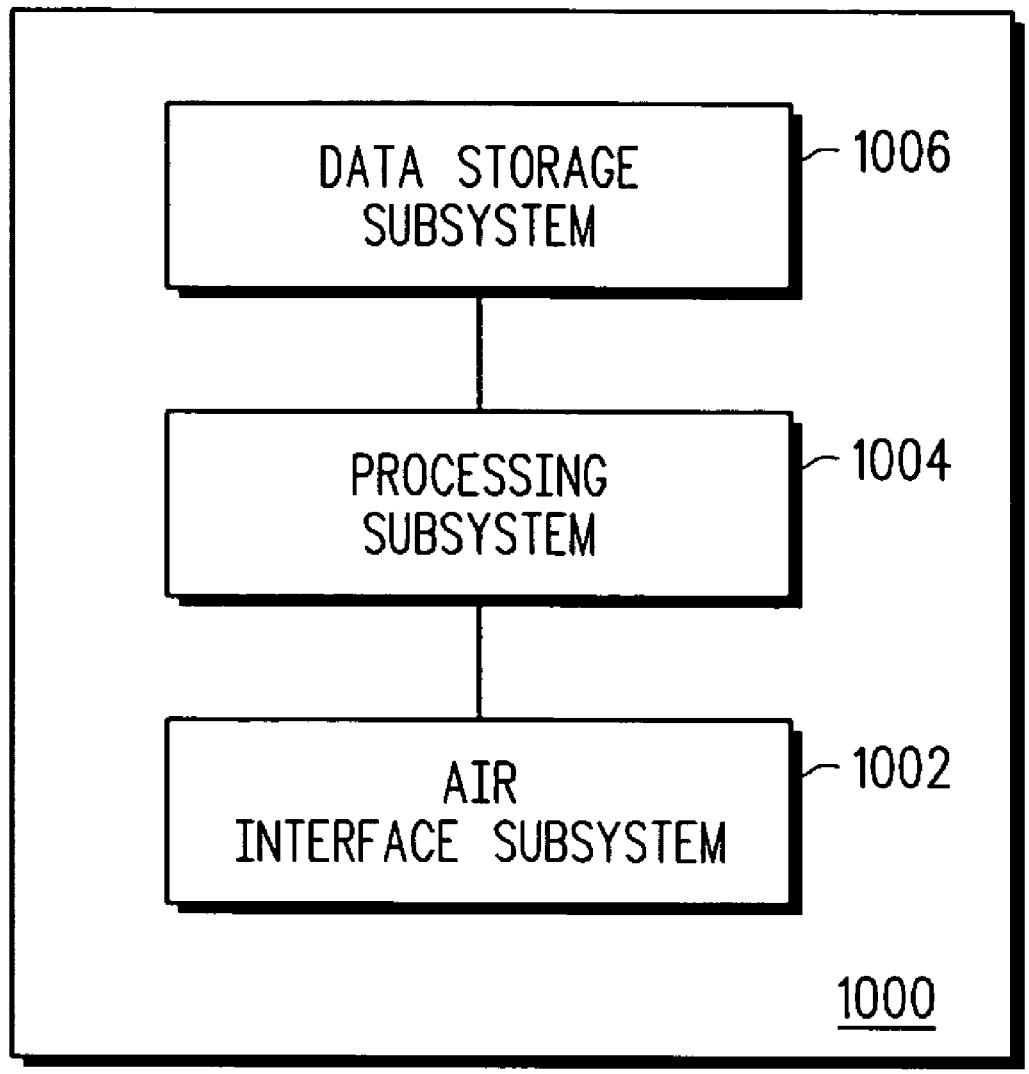
FIG. 10 is a simplified block diagram of a base station, in accordance with an example embodiment.

In various embodiments, processes described in conjunction with FIGS. 8 and 9 may be carried out by at least one system control node and/or by at least one BS. FIG. 10 is a simplified block diagram of a system node 1000 (e.g., a control node or BS), in accordance with an example embodiment. In an embodiment, node 1000 includes at least one air interface subsystem 1002, at least one processing subsystem 1004, and at least one data storage subsystem 1006.

An air interface subsystem 1002 may include one or more antenna subsystems (not illustrated). An air interface subsystem 1002 may receive data from a processing subsystem 1004, convert the data into an analog signal, and cause the signal to be sent out over the air interface. In addition, an air interface subsystem 1002 may receive analog signals from the air interface, convert the signals into digital data, and provide the data to a processing subsystem 1004.

A processing subsystem 1004 may send information to and receive information from an air interface subsystem 1002. In various embodiments, a processing subsystem 1104 may include one or more integrated circuits, among other things. For example, but not by way of limitation, a processing subsystem 1004 may include one or more apparatus selected from a group of apparatus that includes general-purpose processors, special-purpose processors, application-specific integrated circuits (ASICs), and/or other devices, any or all of which may implement one or more process blocks described previously in conjunction with FIGS. 8 and 9, in various embodiments.

A data storage subsystem 1006 may store various types of data, and can include random access memory (RAM), read only memory (ROM), numerous variations of those types of memories, and/or other types of storage. A processing subsystem 1004 may access (e.g., store and/or retrieve) information from data storage subsystem 1006.

Although only one air interface subsystem 1002, processing subsystem 1004, and data storage subsystem 1006 are shown in FIG. 10 for ease of illustration, more of any or all of these subsystems may be included in a system node 1000, in various embodiments. In addition, other subsystems and/or components can be included in node 1000, which enable node 1000 to perform its intended functions. For example, but not by way of limitation, node 1000 also may include subsystems and/or components that enable it to communicate with other system nodes, and/or other wired or wireless networks.

Thus, various embodiments of UE frequency allocation methods and apparatus have been described. Embodiments of the inventive subject matter may provide the advantage of reducing the effects of co-channel interference on system performance. An embodiment includes a method for allocating frequencies to at least one user equipment (UE) in a wireless communication system that includes at least one cell. An embodiment of the method includes classifying a UE into a cell-edge UE group when the UE is within in a cell-edge region of a cell, where the cell-edge UE group is allocated at least one first frequency range within an available bandwidth. An embodiment further includes reclassifying the UE into a cell-center UE group based on at least one indicator of UE performance, where the cell-center UE group is allocated at least one second frequency range within the available bandwidth.

In a further embodiment, reclassifying includes selecting the UE to be reclassified when the at least one indicator of UE performance indicates that a performance of the UE is relatively better than performances of other cell-edge group UEs. A further embodiment includes, before reclassifying, determining a pre-reclassification value of a system metric, and after reclassifying, determining a first post-reclassification value of the system metric. A further embodiment includes reclassifying the UE back into the cell-edge UE group when a comparison of the pre-reclassification value and the first post-reclassification value indicates that the system metric has degraded. A further embodiment includes waiting a period of time after reclassifying the UE back into the cell-edge UE group, and reclassifying the UE or at least one other cell-edge UE into the cell-center UE group based on the at least one indicator of UE performance. A further embodiment includes reclassifying at least one other cell-edge UE into the cell-center UE group when a comparison of the pre-reclassification value and the first post-reclassification value indicates that the system metric has not degraded. A further embodiment includes reclassifying a cell-center UE into the cell-edge UE group based on the at least one indicator of UE performance when a comparison of the pre-reclassification value and the first post-reclassification value indicates that the system metric has degraded. A further embodiment includes selecting the cell-center UE to be reclassified when the at least one indicator of UE performance indicates that a performance of the cell-center UE is relatively worse than performances of other cell-center group UEs. A further embodiment includes, after reclassifying the cell-center UE, determining a second post-reclassification value for the system metric, and reclassifying at least one other cell-center UE into the cell-edge UE group when a comparison of the first post-reclassification value and the second post-reclassification value indicates that the system metric has not degraded.

In a further embodiment, the at least one indicator of UE performance is selected from a group of indicators that includes a data throughput indicator and a signal quality indicator. In a further embodiment, the system metric is selected from a group of metrics that includes an average Carrier-to-Interference plus Noise Ratio and an average data throughput.

Another embodiment of the method includes classifying first selected ones of the multiple UEs as cell-edge UEs when each of the first selected ones are located within in a cell edge region of a cell, where the cell-edge UEs are allocated at least one first frequency range within an available bandwidth. An embodiment also includes classifying second selected ones of the multiple UEs as cell-center UEs when each of the second selected ones are located within in a cell-center region of the cell, where the cell-center UEs are allocated at least one second frequency range within the available bandwidth. An embodiment also includes reclassifying selected ones of the cell-edge UEs into cell-center UEs based on at least one indicator of UE performance, and reclassifying selected ones of the cell-center UE into cell-edge UEs based on the at least one indicator of UE performance.

In a further embodiment, reclassifying the selected ones of the cell-edge UEs includes selecting the selected ones of the cell-edge UEs to be reclassified when the at least one indicator of UE performance indicates that performances of the selected ones of the cell-edge UEs are relatively better than performances of other cell-edge UEs. In a further embodiment, reclassifying the selected ones of the cell-center UEs includes selecting the selected ones of the cell-center UEs to be reclassified when the at least one indicator of UE performance indicates that performances of the selected ones of the cell-center UEs are relatively worse than performances of other cell-center UEs. A further embodiment includes, before reclassifying the selected ones of the cell-edge UEs, determining a pre-reclassification value of a system metric, and after reclassifying the selected ones of the cell-edge UEs, determining a first post-reclassification value of the system metric. A further embodiment includes reclassifying the selected ones of the cell-edge UE back into cell-edge UEs when a comparison of the pre-reclassification value and the first post-reclassification value indicates that the system metric has degraded.

In a further embodiment, the at least one indicator of UE performance is selected from a group of indicators that includes a data throughput indicator and a signal quality indicator. In a further embodiment, the system metric is selected from a group of metrics that includes an average Carrier-to-Interference plus Noise Ratio and an average data throughput. Another embodiment includes an apparatus to allocate frequencies to at least one UE in a wireless communication network that includes at least one cell. In an embodiment, the apparatus includes one or more integrated circuits to classify a UE into a cell-edge UE group when the UE is within in a cell-edge region of a cell, where the cell-edge UE group is allocated at least one first frequency range within an available bandwidth, and to reclassify the UE into a cell-center UE group based on at least one indicator of UE performance, where the cell-center UE group is allocated at least one second frequency range within the available bandwidth. In a further embodiment, the apparatus forms a portion of a node, and the apparatus further includes one or more air interface subsystems, operably coupled to the one or more integrated circuits, to receive uplink signals from UEs over an air interface.

While the principles of the inventive subject matter have been described above in connection with specific systems, apparatus, and methods, it is to be clearly understood that this description is made only by way of example and not as a limitation on the scope of the inventive subject matter. For example, although embodiments employed in the context of a cellular telephone network have been described, it is to be understood that embodiments may be applied to other types of wireless networks, and functions performed in BS or UE may be performed in other types of system nodes or equipment. Further, the phraseology or terminology employed herein is for the purpose of description and not of limitation.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. A method for allocating frequencies to at least one user equipment (UE) in a wireless communication system that includes a system node and at least one cell, the method performed by the system node and comprising:
    in response to a request for service from a UE, classifying the UE into a cell-edge UE group when the UE is within in a cell-edge region of a cell, wherein the cell-edge UE group is allocated first frequencies within an available bandwidth, and wherein the cell-edge region of the cell is physically defined by a cell-edge outer boundary and a cell-edge inner boundary, and a cell-center region of the cell is physically defined by the cell-edge inner boundary;
    providing the service to the UE using one of the first frequencies allocated to the cell-edge UE group;
    during provision of the service, determining that the UE is performing better than other UE that are classified in the cell-edge UE group, based on at least one indicator of UE performance;
    based on the determining step, reclassifying the UE into a cell-center UE group, wherein the cell-center UE group is allocated second frequencies within the available bandwidth, wherein the second frequencies are different from the first frequencies; and
    continuing to provide the service to the UE using one of the second frequencies allocated to the cell-center UE group.

2. The method of claim 1, wherein the at least one indicator of UE performance is selected from a group of indicators that includes a data throughput indicator and a signal quality indicator.

3. The method of claim 1, further comprising:
    before reclassifying, determining a pre-reclassification value of a system metric; and
    after reclassifying, determining a first post-reclassification value of the system metric.

4. The method of claim 3, wherein the system metric is selected from a group of metrics that includes an average Carrier-to-Interference plus Noise Ratio and an average data throughput.

5. The method of claim 3, further comprising:
    reclassifying the UE back into the cell-edge UE group when a comparison of the pre-reclassification value and the first post-reclassification value indicates that the system metric has degraded.

6. The method of claim 5, further comprising:
    waiting a period of time after reclassifying the UE back into the cell-edge UE group; and
    reclassifying the UE or at least one other cell-edge UE into the cell-center UE group based on the at least one indicator of UE performance.

7. The method of claim 3, further comprising:
reclassifying at least one other cell-edge UE into the cell-center UE group when a comparison of the pre-reclassification value and the first post-reclassification value indicates that the system metric has not degraded.

8. The method of claim 3, further comprising:
reclassifying a cell-center UE into the cell-edge UE group based on the at least one indicator of UE performance when a comparison of the pre-reclassification value and the first post-reclassification value indicates that the system metric has degraded.

9. The method of claim 8, further comprising:
selecting the cell-center UE to be reclassified when the at least one indicator of UE performance indicates that a performance of the cell-center UE is relatively worse than performances of other cell-center group UEs.

10. The method of claim 8, further comprising:
after reclassifying the cell-center UE, determining a second post-reclassification value for the system metric; and
reclassifying at least one other cell-center UE into the cell-edge UE group when a comparison of the first post-reclassification value and the second post-reclassification value indicates that the system metric has not degraded.

11. The method of claim 1, wherein determining that the UE is performing better than other UE that are classified in the cell-edge UE group comprises determining that, of the UE and the other UE that are classified in the cell-edge UE group, the UE is performing best.

12. The method of claim 1, wherein determining that the UE is performing better than other UE that are classified in the cell-edge UE group comprises determining that the UE is performing better than average when compared to the other UE that are classified in the cell-edge UE group.

13. The method of claim 1, wherein the at least one indicator of UE performance is a data throughput indicator.

14. A method for allocating frequencies to multiple user equipments (UEs) in a wireless communication system that includes a system node and at least one cell, the method performed by the system node and comprising:
classifying first selected ones of the multiple UEs as cell-edge UEs when each of the first selected ones are located within in a cell-edge region of a cell, wherein the cell-edge UEs are allocated first frequencies within an available bandwidth, and wherein the cell-edge region of the cell is physically defined by a cell-edge outer boundary and a cell-edge inner boundary;
classifying second selected ones of the multiple UEs as cell-center UEs when each of the second selected ones are located within in a cell-center region of the cell, wherein the cell-center UEs are allocated second frequencies within the available bandwidth, wherein the second frequencies are different from the first frequencies, wherein the cell-center region of the cell is physically defined by the cell-edge inner boundary;
during provision of services to first UEs that are classified as cell-edge UEs, determining that the first UEs are performing better than other UEs that are classified as cell-edge UEs, and reclassifying the first UEs as cell-center UEs, and wherein reclassifying results in the first UEs switching from communicating using the first frequencies to communicating using the second frequencies; and
during provision of services to second UEs that are classified as cell-center UEs, determining that the second UEs are performing worse than other UEs that are classified as cell-center UEs, and reclassifying the second UEs as cell-edge UEs, and wherein reclassifying results in the second UEs switching from communicating using the second frequencies to communicating using the first frequencies.

15. The method of claim 14, wherein at least one indicator of UE performance that indicates whether a UE is performing better or worse than other UEs is selected from a group of indicators that includes a data throughput indicator and a signal quality indicator.

16. The method of claim 14, further comprising:
before reclassifying the first UEs, determining a pre-reclassification value of a system metric; and
after reclassifying the first UEs, determining a first post-reclassification value of the system metric.

17. The method of claim 16, further comprising:
reclassifying the first UEs back into cell-edge UEs when a comparison of the pre-reclassification value and the first post-reclassification value indicates that the system metric has degraded.

18. The method of claim 16, wherein the system metric is selected from a group of metrics that includes an average Carrier-to-Interference plus Noise Ratio and an average data throughput.

19. A system node to allocate frequencies to at least one user equipment (UE) in a wireless communication network that includes the system node and at least one cell, the system node comprising:
one or more integrated circuits configured
to classify, in response to a request for service from a UE, the UE into a cell-edge UE group when the UE is within in a cell-edge region of a cell, wherein the cell-edge region of the cell is physically defined by a cell-edge outer boundary and a cell-edge inner boundary, and wherein the cell-edge UE group is allocated first frequencies within an available bandwidth,
to provide the service to the UE using one of the first frequencies allocated to the cell-edge UE group,
during provision of the service, to determine that the UE is performing better than other UE that are classified in the cell-edge UE group, based on at least one indicator of UE performance,
based on the determining step, to reclassify the UE into a cell-center UE group, although the UE remains located in the cell-edge region, based on at least one indicator of UE performance, wherein the cell-center UE group is allocated second frequencies within the available bandwidth, wherein the second frequencies are different from the first frequencies, and
to continue to provide the service to the UE using one of the second frequencies allocated to the cell-center UE group.

20. The system node of claim 19, wherein the system node further comprises:
one or more air interface subsystems, operably coupled to the one or more integrated circuits, to receive uplink signals from UEs over an air interface.

21. The system node of claim 19, wherein the system node is selected from a group consisting of a system control node and a base station.

* * * * *